United States Patent

[11] 3,589,475

| [72] | Inventor | Joseph S. Alford<br>Cincinnati, Ohio |
|---|---|---|
| [21] | Appl. No. | 788,541 |
| [22] | Filed | Jan. 2, 1969 |
| [45] | Patented | June 29, 1971 |
| [73] | Assignee | General Electric Company |

[54] VIBRATION DAMPING MEANS
11 Claims, 6 Drawing Figs.

[52] U.S. Cl. ................................................. 188/1 B,
415/119
[51] Int. Cl. ................................................. F16f 7/10
[50] Field of Search ........................................... 188/1 B;
415/119

[56] References Cited
UNITED STATES PATENTS

| 1,657,390 | 1/1928 | Halikman ..................... | 188/1 (B) |
| 3,319,929 | 5/1967 | Lawrence et al. ............ | 415/119 |

*Primary Examiner*—Duane A. Reger
*Attorneys*—Derek P. Lawrence, Erwin F. Berrier, Jr., Lee H. Sachs, Frank L. Neuhauser and Oscar B. Waddell ABSTRACT: Vibration damping means for a thin-walled shell member are disclosed wherein a severed ring frictionally engages and grips the shell so that during flexural vibration of the shell, which is characterized by flexural waves propagating in either the axial or circumferential direction, or a combination thereof, relative slip occurs between the severed ring and shell.

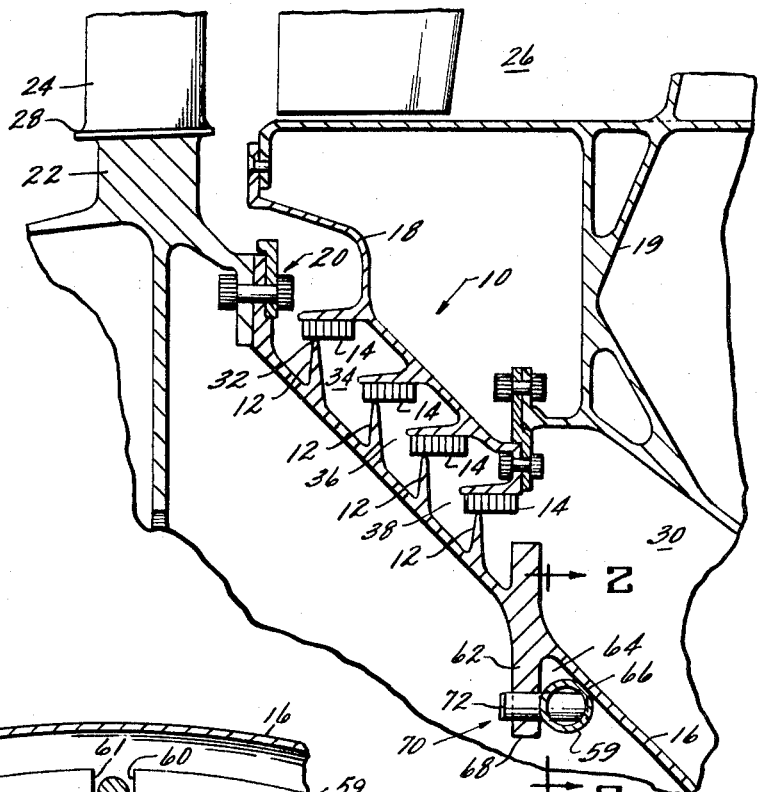
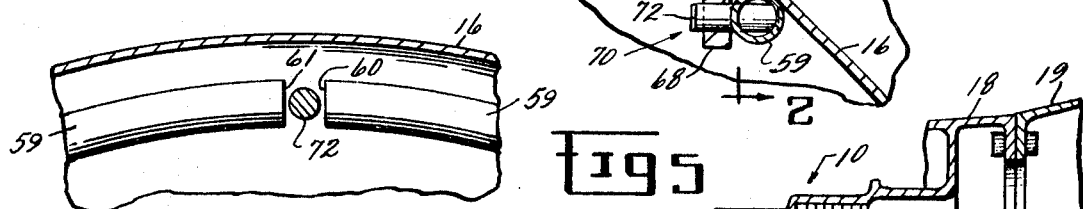
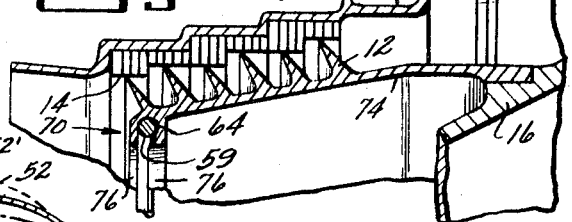
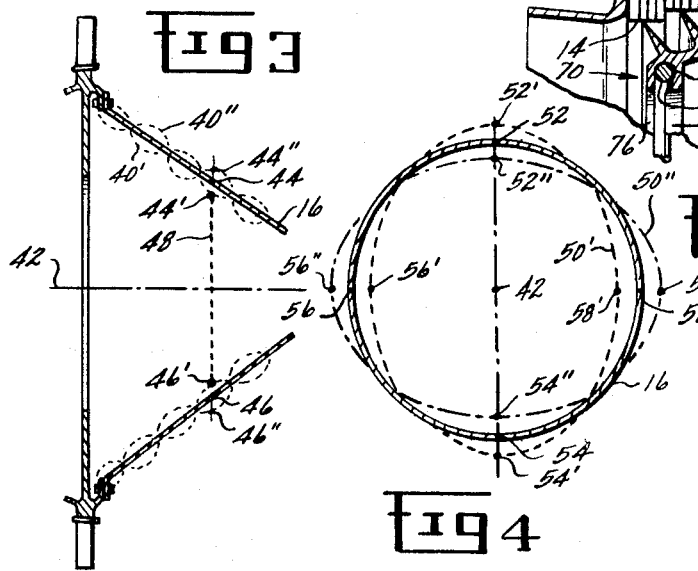
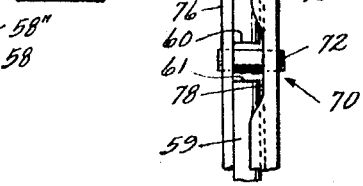
INVENTOR.
JOSEPH S. ALFORD
BY
ATTORNEY

VIBRATION DAMPING MEANS

This invention relates to fluid apparatus and more particularly to means for damping flexural vibration of thin-wall shell members used therein.

Labyrinth seals are commonly employed in fluid apparatus, such as gas turbine engines, to form a fluid seal between rotating and stationary members. Such seals generally comprise a plurality of axially spaced circumferential teeth which extend into sealing relationship with a sealing surface.

In the general case, the seal teeth are carried by the rotating member while the sealing surface is carried by the stationary member, although it may be reversed. Since weight is of primary concern in aircraft gas turbine engines, the rotating member is generally of a thin-wall construction.

In practice, the thin-walled shaft or shell supporting the labyrinth seal teeth has been found to be highly susceptible to a phenomenon referred to herein as self-excited, aeroelastic, nodal flexural vibration. For example, in some configurations, magnification factors in the range of 1,000 to 3,000 have been observed. It has also been observed that this vibration phenomenon may manifest itself in any given application, by circumferentially propagating flexural waves (sometimes referred to as bell-mode vibration), by axially propagating waves, or a combination thereof.

This potentially destructive vibration phenomenon in thin-walled shaft or shell elements which carry labyrinth seal components is presently believed to result from a coupling or phase-matching of the inherent mechanical vibration properties of the thin-walled shaft or shell and the acoustical or pressure properties of the labyrinth seal wherein one reinforces or magnifies the other. In particular, circumferential variations in pressure within each annular chamber formed by the seal teeth, as well as relative pressure variations between such chambers, are experienced due to clearance variations between the seal teeth and the sealing surface and the resonant properties of the chambers. Such pressure variations cause corresponding deflections in the shell or shaft member supporting the seal teeth. At the same time, the supporting shaft or shell will have natural flexural vibration characteristics wherein as the shaft or shell member is rotated, circumferentially propagating nodal flexural waves, axially propagating nodal flexural waves or a combination thereof will be generated. When this natural mechanical flexure, whether axial, circumferential or both, becomes closely phased with the circumferential or axial pressure-induced distortion, one reinforces the other. This results in extremely high magnification factors and displacement amplitudes which may readily produce fatigue failure or cracking in the seal component support or shell member.

While prior art devices have been proposed in connection with this vibration phenomenon, such devices have usually been somewhat complex and expensive in nature. Moreover, such devices have generally been usable only on nonrotating members and have not been effective to prevent self-excited, aeroelastic, nodal flexural vibration which is characterized by both circumferentially and axially propagating nodal flexural waves.

Accordingly, a primary object to this invention is to provide improved and simplified means for preventing destructive self-excited, aeroelastic, nodal flexural vibration in thin-walled members supporting labyrinth seal components.

Another object of this invention is to provide means for damping vibration which may be characterized by axially propagating flexural waves, circumferentially propagating flexural waves, or both.

A further object of this invention is to provide improved and simplified means for damping vibration in a thin-walled rotating shell.

Yet another object of this invention is to provide damping or preventing means as above together with retaining means therefor.

Other objects and advantages of this invention will become apparent upon reading the following description of the preferred embodiments.

Briefly stated, the present invention provides a ring, preferably circular in cross section, which is severed to enable diametral opening and closing thereof. The ring is sized to frictionally grip and exert a radial pressure against the shaft or shell whereby self-excited, aeroelastic, nodal flexural vibration in the shaft or shell which is characterized by circumferentially propagating flexural waves, axially propagating waves, or both, is prevented via the mechanism of heat producing relative slip between the ring and the shell. The severed ring is preferably located at a position on the shaft or shell where large radial displacements are experienced so as to optimize the amount of relative slip between the severed ring and the shell and thereby optimize the energy dissipated. Means for retaining the ring without inhibiting relative slip between the ring and the shaft or shell are also provided.

While the specification concludes with claims particularly pointing out and distinctly claiming the subject matter of this invention, it is believed the invention will be better understood from the following description of the preferred embodiments when taken in connection with the accompanying drawings wherein:

FIG. 1 is a partial sectional view showing an exemplary gas turbine engine labyrinth seal employing the improved damping means of this invention;

FIG. 2 is a partial cross-sectional view taken along line 2–2 of FIG. 1;

FIG. 3 is a view schematically showing one mode of self-excited, aeroelastic, nodal flexural vibration in a shaft or shell with which this invention is concerned;

FIG. 4 is a view schematically showing another mode of self-excited, aeroelastic, nodal flexural vibration with which this invention is concerned;

FIG. 5 is a partial cross-sectional view, like that of FIG. 1, showing yet another gas turbine engine labyrinth seal employing the improved damping means of this invention; and FIG. 6 is an enlarged view of the entry slot and retaining means of FIG. 5.

Like reference numerals will be used in referring to like parts throughout the following description of the preferred embodiments.

Referring now to FIG. 1, an exemplary gas turbine engine labyrinth seal has been shown at 10 as comprising a plurality of axially spaced teeth 12 which extend into sealing relationship with a suitable surface 14. The teeth 12 and sealing surface 14 are generally annular and are carried respectively by a thin-walled shell or shaft member 16 and a suitable stationary member 18 secured to the engine casing 19, although this arrangement may be reversed.

The shaft 16 is secured at one end, as at 20, to a suitable compressor or turbine disc 22. The compressor or turbine disc 22 carries a plurality of blades 24 at its periphery which extends across an annular fluid passage 26 defined in part by the casing 19 and a blade platform portion 28.

The seal 10 is operative to minimize high pressure fluid leakage from annular passage 26 into a chamber 30 defined in part by the shaft member 16 and engine casing 19. It will be recognized, however, that there will be some leakage of high pressure fluid from passage 26 through the clearance passages 32, existing between the tip of each tooth 12 and its respective sealing surface 14, through annular chambers 34, 36 and 38 which are defined by the teeth 12 and members 16 and 18, into chamber 30.

As previously mentioned, circumferential fluid pressure variations within each annular chamber 34, 36 and 38, as well as relative pressure variations between the chambers 34, 36 and 38, may be expected due to clearance passage variations and acoustical or pressure resonant frequencies of the chambers 34, 36 and 38. Since the pressure within each chamber 34, 36 and 38 acts against the member 16, circumferential pressure variations within such chambers cause circumferential distortion within the member 16. Likewise, the relative pressure variations between chambers 34, 36 and 38 are responded to by corresponding axial distortions within the shaft 16.

As will be understood, depending upon the specific configuration of the shaft 16, whether one or both ends are rigidly secured and the attachment means employed, the shaft 16 may have one or more inherent modes of natural mechanical nodal flexural vibration. The phenomenon herein referred to as self-excited, aeroelastic, nodal flexural vibration, as previously mentioned, is believed to occur when there is a coupling or phase matching between the pressure induced distortions in the member 16 and the natural mechanical flexural vibration of member 16 whereupon one reinforces and magnifies the other. Again, depending upon the specific configuration of the labyrinth seal component supporting member 16, whether one or both ends of the member 16 are supported, and the attachment means employed, the phenomenon of self-excited, aeroelastic, nodal flexural vibration may manifest itself in one or both of two flexural modes. One such flexural mode has been shown schematically in FIG. 3 and is characterized by an axially propagated flexural wave indicated by lines 40' and 40" which is generally circumferentially symmetrical about the rotational axis 42 of the member 16. In this mode of vibration, all points on the member 16 in any intersecting nonnodal plane which is normal to axis 42, for example points 44 and 46, oscillate radially inwardly and outwardly in unison, for example, between points 44' and 44" and points 46' and 46". Accordingly, an incremental circumferential band 48 connecting points 44 and 46 would constantly fluctuate in diameter while remaining concentric to axis 42.

The other mode (sometimes referred to as bell mode vibration) in which the member 16 may experience self-excited, aeroelastic, nodal flexural vibration has been shown schematically in FIG. 4 by the circumferentially propagating flexural wave 50', 50". It will be noted that in this flexural mode, and as distinguished from the axially propagating wave mode of FIG. 3, all points of member 16 in an intersecting plane which is normal to axis 42 do not oscillate radially inwardly and outwardly in unison. For example, while diametrically opposed points 52 and 54 are moving radially inwardly from points 52' and 54' to points 52" and 54", respectively, points 56 and 58 which are displaced 90° therefrom are moving radially outwardly from points 56' and 58' to points 56" and 58" respectively. Accordingly, it will be noted that in this mode an incremental circumferential band does not retain the nonexcited shape of member 16.

It will be recognized that the flexure characterized by a circumferentially propagating wave, has, for illustrative purposes, been greatly simplified and that in an actual application such vibration would typically be more complex in that the number of diametral nodes would be increased and such nodes would tend to move about the periphery of the member 16. Also, although each flexural mode has been depicted independently, in actual applications both modes will generally be present at the same time, with one or the other of the modes predominating.

Referring again to FIGS. 1 and 2, and in accordance with the present invention, a severed, preferably metallic, ring 59 is provided to damp or prevent the occurrence of self-excited, aeroelastic, nodal flexural vibration in the member 16 and thereby prevent fatigue failure of such thin-walled member. The ring 59 is formed with circumferentially spaced ends 60 and 61 to allow diametral opening and closing of the ring. As shown in FIG. 1, a radially inwardly directed flange 62 is provided to prevent the ring 59 from moving axially or "walking" along the conoidal member 16. The flange 62 forms a groove 64, in cooperation with the conoidal member 16, into which the ring 59 may be inserted.

The ring 59 is diametrically sized, in its free state, slightly larger than the diameter it will assume when placed within the groove 64 so that when in the groove 64, it will yieldingly and frictionally engage the member 16, as at 66, and exert a generally radially directed pressure against the member 16. It will be noted that the line of engagement 66 is generally continuous, being broken only by severed ends 60, 61.

The ends 60 and 61 of ring 59 are peripherally spaced a sufficient distance to enable closing the ring so as to allow the ring to pass under the flange inner surface 68 and, hence, enable insertion of the ring 59 into groove 64.

As will be understood, when the member 16 is rotating, the ring 59 may be subject to sudden impulsive forces or jerks which could conceivably result in the ring 59 escaping from groove 64. To prevent such escape and at the same time permit opening and closing of the ring 59 and relative slip between ring 59 and the member 16, means 70 is provided, which may take the form of a pin 72 extending axially between the spaced ring ends 60 and 61 as shown in FIG. 2. The pin 72 may be riveted, threadably engaged or otherwise suitably secured to the flange 62 and is sized to abut the ring ends 60, 61 to prohibit closing of the ring 59 to an outer diameter less than that of flange surface 68, yet spaced sufficiently from ends 60 and 61 to enable opening and closing of the ring.

While the ring 59 is conveniently circular in cross section and of hollow construction because of weight considerations, it should be understood that it may be solid and of any geometrical cross section.

Referring now to FIG. 5, the damping means of this invention has been shown in conjunction with a labyrinth seal 10 of the type having its teeth 12 supported by a generally cylindrical thin-walled shell member 74 which is suitably secured at one end thereof to the conoidal shaft member 16. In the configuration of FIG. 5 a modified form of the retaining means 70 has been shown wherein the retaining groove 64 is formed by axially spaced flanges 76 and is shaped in cross section so as to prevent extraction of the ring 59 except at one location, such as an enlarged opening as at 78 in FIG. 6. In this form, the ring 59 is inserted into the groove 64 through the enlarged opening or entry slot 78. With the ring fully contained in groove 64, the enlarged opening 78 may be effectively closed by suitable means, such as the pin 72, to thereby securely retain the ring while at the same time permit relative slip between the ring and the member 74.

The use, operation and function of this invention are as follows:

As the member 16 and the ring 59 rotate, centrifugal force will urge the ring into tighter frictional engagement with the member 16. In this regard the ring 59 is sized so that under the action of centrifugal force the radial pressure exerted against member 16 or member 74 will not be so great as to prevent relative slip between a ring and the member 16 or 74. As previously mentioned, when member 16 or 74 rotates there may be a tendency in that member to enter into self-excited, aeroelastic, nodal flexural vibration in one or both of the modes described in connection with FIGS. 3 and 4. When vibrating in the mode of FIG. 3, the line of frictional engagement between the ring 59 and the member 16 or 74 uniformly increases and decreases in diameter. Since the ring 59 is severed, it will open and close and follow the diametral fluctuations in member 16 or 74. However, because the actual length of ring 59 remains generally constant, there will be relative slip between this ring 59 and the member 16 or 74 during each opening and closing motion. At the same time the ring 59 is urged against the member 16 or 74 by centrifugal force as well as its inherent spring force whereby the relative slip generates heat and dissipates the vibrational energy. Since the ring 59 engages the member 16 or 74 around its entire periphery, wear on the ring 59 is generally evenly distributed.

When the member 16 or 74 tends to vibrate in the mode characterized by a circumferentially propagating wave as shown in FIG. 4, again there is produced an opening and closing motion of the ring 59 which results in heat producing relative slip between the ring 59 and the member 16 or 74 thereby dissipating such vibrational energy.

While ring 59 may not maintain continuous peripheral engagement with the member 16 or 74 when the latter is vibrating in the mode of FIG. 4, since the points of frictional contact will be continuously changing, the wear on the ring 59 will again be generally uniformly distributed around the ring.

The ring 59 may be conveniently retained against axial movement along the member 16 or 74 by simply providing a groove 64 into which the ring is snapped or inserted as in FIGS. 1 and 5 respectively. Once positioned within the groove 64, escape may be prevented during any high excitation period by providing means which in one form utilizes the pin 72 to limit the closing movement of ring 59 and in another form utilizes the pin 72 to effectively close the enlarged opening 78 through which the ring might be removed.

The ring 59 is preferably located at or close to the location of maximum flexural displacement of the member to be damped. Where the axially propagated wave mode of FIG. 3 is involved, the optimum location for the ring 59 is at an antimode. Where the circumferentially propagated wave mode of FIG. 4 is involved, the optimum location for the ring 59 will generally be at a point most remote from the points of connection of the member with other structure, as is illustrated, for example in FIG. 5.

While the subject matter of this invention is particularly adapted for use on a rotating labyrinth seal-carrying member, such as the member 16 or 74, it should be understood that the severed ring 59 may also be employed to damp flexural vibration in the stationary labyrinth seal component carrying member 18 or other thin-wall shell members. Further, although several embodiments of the invention have been depicted and described, it should be understood that many alterations, modifications and additions may be made without departing from the invention's fundamental theme.

What I claim is:

1. Means for damping vibration of a thin-walled annular shell, said means comprising a metallic ring severed to enable diametral opening and closing motion thereof, said ring sized to frictionally engage said shell substantially continuously along its length and yieldingly exert a generally radially directed pressure against said shell, whereby the flexure produced in said shell by both axially propagating, nodal flexural waves and circumferentially propagating nodal flexural waves results in heat producing relative slip between said ring and said shell.

2. The structure of claim 1 further characterized in that said ring is circular in cross section.

3. The structure of claim 1 further characterized in that said thin-walled shell is adapted for rotation, said severed ring being located internally of said shell whereby said radial pressure is derived, in part, by centrifugal force.

4. The structure of claim 1 further characterized by and including means for retaining said ring at a predetermined axial position along said shell without restricting said relative slip.

5. The structure of claim 4 further characterized in that said retaining means comprises an inwardly opening circumferential groove sized to receive said ring, the ends of said ring being peripherally spaced sufficiently to enable insertion of said ring in said groove, and a pin positionable intermediate the ends of said ring.

6. The structure of claim 4 further characterized in that said retaining means comprises a circumferential groove sized to receive said ring and prohibit radial extraction of the ring therefrom, an enlarged opening to enable insertion of said ring into said groove, and means for effectively closing said enlarged opening after inserting said ring.

7. In a fluid apparatus having a labyrinth seal for reducing fluid leakage between a stationary member and a thin-walled rotating member, said seal including means carried by one of said members for defining at least one annular sealing surface and a plurality of axially spaced teeth carried by the other of said members, each said tooth extending into fluid sealing relationship with one of said sealing surfaces, the improvement comprising:

a ring severed to enable diametral opening and closing thereof, said ring positioned and sized to circumferentially grip and exert a radial pressure against said rotating member under the action of centrifugal force whereby destructive, self-excited, aeroelastic, nodal flexural vibration of said rotating member, which may be characterized by both axially and circumferentially propagating nodal flexural waves, is prevented by heat producing relative slip between said ring and said rotating member.

8. The structure of claim 7 further characterized in that said ring is circular in cross section.

9. The structure of claim 7 further characterized by and including means for retaining said ring in a predetermined location along the axis of said rotating member.

10. The structure of claim 9 further characterized in that said predetermined location of said ring is close to the position of maximum flexure of said rotating member.

11. Means for damping vibration of a rotating thin-walled annular shell, said means comprising a ring severed to enable diametral opening and closing motion thereof, said ring disposed internally of said shell and sized to frictionally engage said shell substantially continuously along its length and yieldingly exert a generally radially directed pressure against said shell, whereby the flexure produced in said shell by both axially propagating nodal flexural waves and circumferentially propagating nodal flexural waves results in heat producing relative slip between said ring and said shell.